United States Patent
Dabrowski

(10) Patent No.: US 9,482,552 B2
(45) Date of Patent: Nov. 1, 2016

(54) METHOD OF SIMULATING A REAL-TIME AIRCRAFT SYSTEM INPUT TO AN AVIONICS COMPONENT

(71) Applicant: GE Aviation Systems LLC, Kentwood, MI (US)

(72) Inventor: Stephen Dabrowski, Kentwood, MI (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 0 days.

(21) Appl. No.: 14/311,436

(22) Filed: Jun. 23, 2014

(65) Prior Publication Data

US 2015/0369626 A1    Dec. 24, 2015

(51) Int. Cl.
| | |
|---|---|
| *G01C 23/00* | (2006.01) |
| *G06F 19/00* | (2011.01) |
| *G01S 15/87* | (2006.01) |
| *G07C 5/00* | (2006.01) |
| *G08G 5/00* | (2006.01) |
| *H04W 8/20* | (2009.01) |
| *G01S 15/89* | (2006.01) |
| *H04W 8/18* | (2009.01) |
| *B64D 13/00* | (2006.01) |
| *G06F 17/00* | (2006.01) |

(52) U.S. Cl.
CPC ............... *G01C 23/00* (2013.01); *B64D 13/00* (2013.01); *G01S 15/87* (2013.01); *G01S 15/89* (2013.01); *G01S 15/8902* (2013.01); *G06F 17/00* (2013.01); *G06F 19/00* (2013.01); *G07C 5/00* (2013.01); *G08G 5/0021* (2013.01); *G08G 5/0082* (2013.01); *H04W 8/18* (2013.01); *H04W 8/183* (2013.01); *H04W 8/205* (2013.01)

(58) Field of Classification Search
CPC ......... G06F 19/00; G06F 17/00; G06T 1/00; G01C 23/00; G08G 5/0086; G08G 5/0021; G08G 5/0082; G05D 1/06; G05D 1/0676; G05D 1/00; B64C 13/00; B64C 13/20; G07C 5/00; A62B 7/14; B64D 13/00; G01S 15/89; G01S 13/91; G01S 13/00; G01S 15/8902; G01S 15/87; G08B 21/00; H04W 8/18; H04W 8/205; H04W 8/183
See application file for complete search history.

(56) References Cited

U.S. PATENT DOCUMENTS

| | | | |
|---|---|---|---|
| 4,604,711 A | 8/1986 | Benn et al. | |
| 5,200,901 A * | 4/1993 | Gerstenfeld | ............ G01S 13/91 |
| | | | 701/120 |
| 7,895,001 B2 | 2/2011 | Tanju et al. | |

(Continued)

FOREIGN PATENT DOCUMENTS

| | | |
|---|---|---|
| CN | 103065507 A | 4/2013 |
| CN | 104050332 A | 9/2014 |

(Continued)

OTHER PUBLICATIONS

GB Combined Search and Examination Report issued in connection with corresponding GB Application No. 1510498.7 on Dec. 4, 2015.

*Primary Examiner* — Behrang Badii
(74) *Attorney, Agent, or Firm* — GE Global Patent Operation; William S. Munnerlyn

(57) ABSTRACT

A method of simulating a real-time aircraft system input to an avionics component for an aircraft includes receiving the simulation input and providing the simulated input to the avionics component.

15 Claims, 4 Drawing Sheets

(56) References Cited

U.S. PATENT DOCUMENTS

| | | | |
|---|---|---|---|
| 2002/0111720 A1* | 8/2002 | Holst | G06F 8/61 701/3 |
| 2003/0093187 A1* | 5/2003 | Walker | B64C 13/20 701/1 |
| 2007/0271009 A1* | 11/2007 | Conroy, Jr. | B64D 13/00 701/10 |
| 2008/0119970 A1* | 5/2008 | Campbell | G05D 1/0676 701/8 |
| 2010/0211237 A1* | 8/2010 | Nichols | G01C 23/00 701/14 |
| 2011/0071709 A1 | 3/2011 | Damiani et al. | |
| 2014/0081483 A1* | 3/2014 | Weinmann | G08G 5/0021 701/14 |
| 2015/0192928 A1* | 7/2015 | Sastre I Sastre | G01C 11/02 701/25 |

FOREIGN PATENT DOCUMENTS

| | | |
|---|---|---|
| EP | 1769465 B1 | 10/2012 |
| WO | 2004095839 A1 | 11/2004 |
| WO | 2005119600 A1 | 12/2005 |
| WO | 2007005449 A2 | 1/2007 |
| WO | 2011123616 A1 | 10/2011 |

* cited by examiner

METHOD OF SIMULATING A REAL-TIME AIRCRAFT SYSTEM INPUT TO AN AVIONICS COMPONENT

BACKGROUND OF THE INVENTION

Avionics systems for aircraft may include several components for operating and aircraft. For example, data generating components, for example air speed sensors, global positioning system (GPS), inertial reference sensors (INU), communication units (ACARS), and pilot-accessible control panels may generate input data or data signals (collectively referred to as "data") for a computing system, such as a flight management system (FMS). The FMS, in turn, computes or processes the data to control certain aircraft operations or systems, such as autopilot, or to provide a pilot with relevant aircraft operating information, such as by providing a flight plan and/or heading, or by controlling a primary flight display.

BRIEF DESCRIPTION OF THE INVENTION

In one aspect, a method of simulating a real-time, aircraft system input for an avionics component of an aircraft. The method comprises receiving a user demand for a real-time, aircraft system input, retrieving data streams corresponding to the user demand from a data-base of previously recorded, real-time data streams, time-synchronizing the retrieved data streams, and providing the time-synchronized data streams as input to the avionics component.

DESCRIPTION OF EMBODIMENTS OF THE INVENTION

Figure 1:
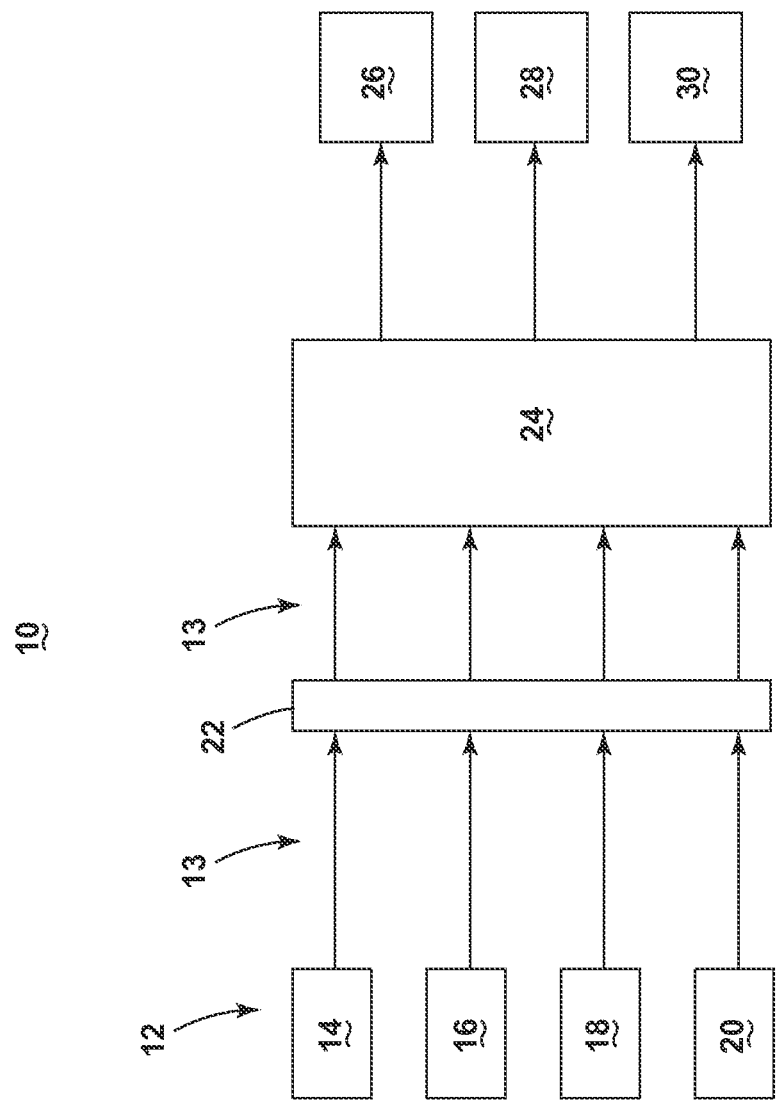
FIG. 1 is a schematic view of an avionics system for an aircraft.

Embodiments of the invention may be implemented in any environment simulating a plurality of data streams for use as one or more inputs to a computing and/or control system. While this description is primarily directed toward an aircraft and/or avionics system environment, embodiments of the invention are applicable in any environment using a machine plurality of data inputs provided to a data receiving component. Thus, a brief summary of the contemplated environment should aid in a more complete understanding.

Modern aircraft include avionics systems or components to perform individual or system functions for the aircraft in response to data signal and/or data inputs (collectively, referred to as "input data streams") generated by sensors, pilot accessible controls, and/or additional avionics systems. Non-limiting examples of data-generating inputs may include at least one of an inertial reference device, a global positioning system (GPS), an inertial reference sensor (INU), one or more communication units (ACARS), an air data computer, instrument landing systems, navigation systems, distance measuring equipment systems, or selectable control panel inputs, such as pilot-controlled model control panels or display control panels. The pilot-controlled control panels may include, for example, knobs, buttons, mice, touchscreens, etc. for receiving pilot input. In this sense, the input data streams may be representative of, respectively, at least one of an inertial reference data, a global positioning system data, air data computer data, instrument landing system data, navigation data, distance measuring equipment data, or selectable control panel data. Further non-limiting examples of additional avionics systems or components may include communications systems, navigation systems, the display and management systems, collision-avoidance systems, weather radar, and even health and usage monitoring systems.

One illustrative avionics component is the flight management system (FMS). The FMS is a specialized computer system that automates a wide variety of in-flight tasks, reducing the workload on the pilots and/or crew. The FMS may compute and/or process data related to the flight planning, generation of flight path, speed profiles tied to waypoints, and other flight planning aspects, in response to input data received from input data streams.

The FMS may also control one or more interfaces for displaying the resulting functions performed by the FMS, such as a primary flight display (PFD), a control display unit, and/or a navigational display, each of which may be located in the cockpit. For example, the PFD utilizes the input data, the FMS, and/or other avionics systems to make altitude, airspeed, vertical speed, and other measurements precisely using air pressure and barometric readings, which are displayed to the pilot in a readable format. Like many displays, these interfaces may be built around an LCD or CRT display device, and may have additional pilot-controllable inputs, such as buttons, knobs, levers, or pointing devices such as a mouse, for interacting with the interface and/or FMS.

FIG. 1 illustrates a schematic view of an avionics system 10 for use in an aircraft. As shown, one or more aircraft system inputs, or data generating inputs 12, shown including a GPS device 14, an air data computer 16, a distance measuring equipment device 18, and a display control panel 20 generate input data which may be provided to an avionics data bus 22. In this sense, the data generating inputs 12 may provide a plurality of input data streams 13, or "channels" of input data, to the data bus 22, in real time. The data bus 22, in turn, may provide the input data to another avionics system component, such as a flight management system (FMS) 24. In the illustrated example, the FMS 24 performs computations and/or processes the input data, which is then provided to one or more additional avionics systems, components, and/or interfaces, shown as the control display unit 26, PFD 28, and navigation display 30. Additional data generating inputs 12 and additional avionics components and/or interfaces may be included, as the components shown are merely non-limiting examples of such components.

The avionics data bus 22 may include one or more routing or switching components to operably deliver the data streams 13 to the FMS 24. In this sense, embodiments of the avionics data bus 22 may include systems and/or interfaces capable of transmitting analog and/or digital data streams 13 through a network bus interface. One non-limiting example of an interface medium for transmitting the data streams 13 may include Ethernet. Additional medium for transmission may be included. In another example, the data bus 22 may include functional components capable of, for instance, converting an analog signal to a digital signal for transmission, or vice versa. The data bus 22 may also operate in accordance with a set of industry or regulation standards. Non-limiting examples of standards for operating the data bus 22 may include ARINC 429 and ARINC 664. Additional standards may be included and/or incorporated.

The embodiment illustrated in FIG. 1 may be used to operate the avionics system, as described, in an aircraft; however, alternative operating environments may be included. For example, for the purposes of development, testing, maintenance, etc., it may be beneficial to provide such an avionics system 10 in a non-aircraft setting, such as a development or testing lab. However, reproducing the operations of the illustrated avionics system 10 in such an environment raises particular difficulties in providing access to data generating inputs 12 capable of generating the data streams 13 due to lack of exposure of the inputs 12 to aircraft-like operating environments, such as high altitude, temperatures, wind speeds, etc.

European Patent EP769465 ("the '465 patent"), incorporated herein by reference, in its entirety, discloses a random access recording method for recording and playback of avionics data for a similar avionics system, wherein, for example, the data streams 13 of the data generating inputs 12 are recorded and stored as a plurality of data files in similar or dissimilar data formats, in a time-ordered fashion. In addition to recording and storing the plurality of data streams, the '465 patent teaches storing a separate timeline referenced pointer file for providing a recorded, time-based index for the plurality of stored data streams, such that a particular (non-starting) playback time can be selected during playback of the stored data, and the recorded time index may be used to correspond to a common timeline for the stored data streams, and permits access to the stored data streams according to that particular playback time. In this sense, the '465 patent provides for capabilities to use an avionics system 10 on an aircraft, during flight operations, to record and store the data streams 13 of the data generating inputs 12 in a time-ordered and real-time fashion, for playback at a later time.

Figure 2:
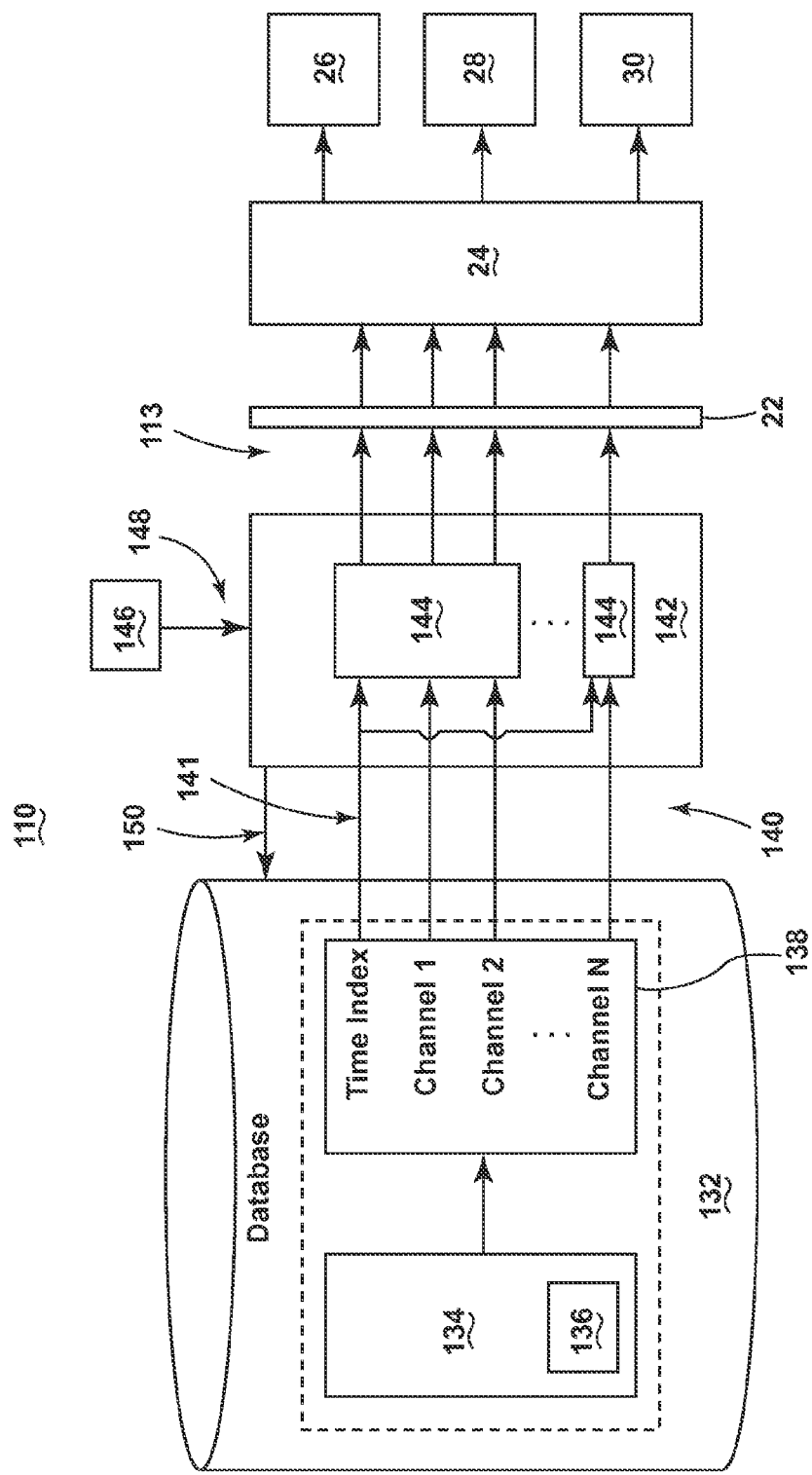
FIG. 2 is a schematic view of an avionics system with an avionics simulation device, in accordance with an embodiment of the invention.

FIG. 2 illustrates another avionics system 110 for simulating a real-time aircraft system input to a real or simulated avionics component, such as the FMS 24, from one or more recorded and stored data files. This embodiment is similar to the avionics system 10 of FIG. 1; therefore, like parts will be identified with like numerals increased by 100, with it being understood that the description of the like parts of FIG. 1 applies to the embodiment of FIG. 2, unless otherwise noted. As shown, a memory storage device 132 provides one or more inputs to a playback device 142, which in turn, provides one or more simulated data streams 113 to the avionics data bus 22 and/or to the avionics component, shown as the FMS 24. The playback device 142 further receives at least one user input from a user interface 146.

The memory storage device 132 may include memory 134 such as random access memory (RAM), read-only memory (ROM), flash memory, or one or more different types of portable electronic memory, such as discs, DVDs, CD-ROMs, etc., or any suitable combination of these types of memory, for storing previously recorded, time-ordered and real-time recorded avionics data 136, such as the data streams 13 of FIG. 1. Non-limiting examples of the avionics data 136 may include one or more data files stored in a hierarchical file system format, or a data-base format. Additional storage systems and/or formats may be included.

The memory storage device 132 is further illustrated including a controller 138 configured to access the avionics data 136, and generate a plurality of data channels 140 from the avionics data 136, wherein each channel 140 has a time-ordered relationship with a corresponding data stream 113. The plurality of channels 140 is then provided to the playback device 142.

The controller 138 may, for example, read, access, or retrieve one or more instances of the recorded avionics data 136 stored in the memory 134, and parse the data 136 into the plurality of channels 140. In addition to the plurality of channels 140, the controller 138 may read, access, or retrieve the above-described recorded time index 141, related to the recorded avionics data 136, and provide the recoded time index 141 to the playback device 142 along with the plurality of channels 140. While the accessing the recorded time index 141 is described, embodiments of the invention may include reading, accessing, or retrieving only a portion of the recorded time index 141, or, for example, streaming information from the index 141 to the playback device 142 corresponding to the retrieved avionics data 136 and/or plurality of channels 140.

Alternatively, embodiments of the invention may include the controller 138 parsing characteristics and/or information stored in the recorded time index 141 into one or more of the plurality of channels 140. While a plurality of channels 140 are shown providing one channel to the playback device 142, in parallel, for each channel of parsed data 136, embodiments of the invention may include as few as one physical connections, for example a single Ethernet connection, for providing the plurality of channels 140 to the playback device 142.

The playback device 142 is shown including at least one playback controller 144, wherein each playback controller 144 receives at least one channel 140 in addition to the recorded time index 141, and simulates, provides, and/or converts each channel 140 of avionics data 136 to a data stream 113, to be provided to the avionics data bus 22. The playback controller 144 may also be connected with any other controllers of the data-collecting aircraft playback device 142, and, for example, may include memory including executable program code, and one or more processors, which may be running any suitable programs stored in the memory or remotely.

The user interface 146 may be any interface device utilized to capture one or more user inputs, or user demands 148, for controlling the operation and/or playback of the playback device 142 and/or avionics system 110. Non-limiting examples of user interface devices may include knobs, buttons, touchscreens, computer user interfaces, and/or a computer mouse. In one embodiment, the user may be provided user interface 146 having a selectable and/or graphical timeline representing the time-ordered recorded avionics data. The user may interact with the user interface 146 to generate the user demand 148, which is provided to the playback device 142.

In one example of a user demand 148, a user may include selecting one or more available data channels 140 and/or data streams 113 that the user desires be provided to the FMS 24. In this example, the user demand 148 provided to the playback device 142 may use the controller 144 to, for example, control which channels 140 are provided to the playback device 142, by way of a control signal 150, provided to the memory storage device 132. Alternative, the memory storage device 132 may supply all available data channels 140, and the playback device 142, in response to the user demand 148, may operate only on the channels 140 corresponding to the selected channels of the user demand 148.

In another example of a user demand 148, a user may desire to jump the playback of the data channels 140 and/or data streams 113 to, for example, a non-starting time position, or a non-sequential time position relative to the current playback, such as returning to the starting of the recorded avionics data 136 from a non-starting position. In this example, the user demand 148 provided to the playback device 142 may use the controller 144 to, for example, control the memory storage device 132, by way of the control signal 150, and the playback device 142, to stop the current retrieval of avionics data 136, and begin a new retrieval of avionics data 136 corresponding to the user-selected time position of the user demand 148.

In yet another example of a user demand 148, a user may desire to accelerate or decelerate the playback rate of the data channels 140 and/or data streams 113 to, for example, real-time speed, faster than real-time speed (e.g. double speed), or slower than real-time speed (e.g. half speed). Additional user-selectable speeds, time steps, stop time, playback length, direction of playback (e.g. forward in time or reverse in time), and/or constant or variable time step increments may be included. In this example, the user demand 148 provided to the playback device 142 may use the controller 144 to, for example, control the memory storage device 132, by way of the control signal 150, and the playback device 142, to provide the plurality of channels 140 and/or data streams 113 at the selected playback rate.

The playback controller 144 may additionally manipulate data received by each respective channel 140, according to information received in the recorded time index 141. For example, the recorded time index 141 may inform the playback controller 144 that during recording, 10 bytes of data was recorded every 80 microseconds for a particular channel. In this example, the playback controller 144 may parse the data received on that particular channel into 10 byte portions prior to providing the data, as input, to the avionics data bus 22 and/or the FMS 24. In this sense, the data stream 113 for that particular channel may not be a continual stream of data, but rather a stream of parsed 10 byte data portions, provided every 80 microseconds.

While one example of 10 bytes of data recorded every 80 microseconds is described, embodiments of the invention may include data streams have different data amounts, different timing requirements, or even true, continual streams of uninterrupted data transmission. Further embodiments of invention may include segregating different channels 140 into one or more corresponding playback controllers 144 according to common recorded data characteristics or recorded time index 141 values. For example, all channels 140 that provide data every 80 microseconds may be processed by a first playback controller 144, while all channels 140 that provide data every 20 microseconds may be processed by a second playback controller 144. In this sense, different playback controllers 144 may be specifically configured to handle certain data streams 113 according to processor load sharing, cycle time, and/or data size or time resolution (e.g. how much data, how often). In this example, each playback controller 144 may process at least one or more channels 140.

Furthermore, each playback controller 144 receives the recorded time index 141, at least one channel 140, and the user demand 148, and attempts to time-synchronize the simulated providing of the data streams to the avionics data bus 22 and/or the FMS 24, in relative accordance with the timing of the previously recorded, real-time avionics data streams. Stated another way, the playback controller 144 attempts to faithfully recreate and/or simulate the recorded avionics data streams, by providing the recorded data streams to the data bus 22 and/or FMS 24 in fidelity with the original recorded data streams' timing. The technical effect of embodiments of the invention is that the playback device 142 may provide the simulated data streams, from a recording of actual data streams, to one or more avionics components, wherein the providing is time-synchronized with the original recording. In this sense, a method of simulating realistic, real-time aircraft system input to an avionics component can be achieved in a non-aircraft setting, such as a lab or development setting. Furthermore, the same recorded data may be simulated, repeatedly, while testing or development of an avionics component.

The time-synchronizing may occur, for example, on a per channel 140 or a per data stream 113 basis. In another example, the time-synchronizing may occur on a per playback controller 144 basis, wherein the channels are segregated, as explained above.

Figure 3:
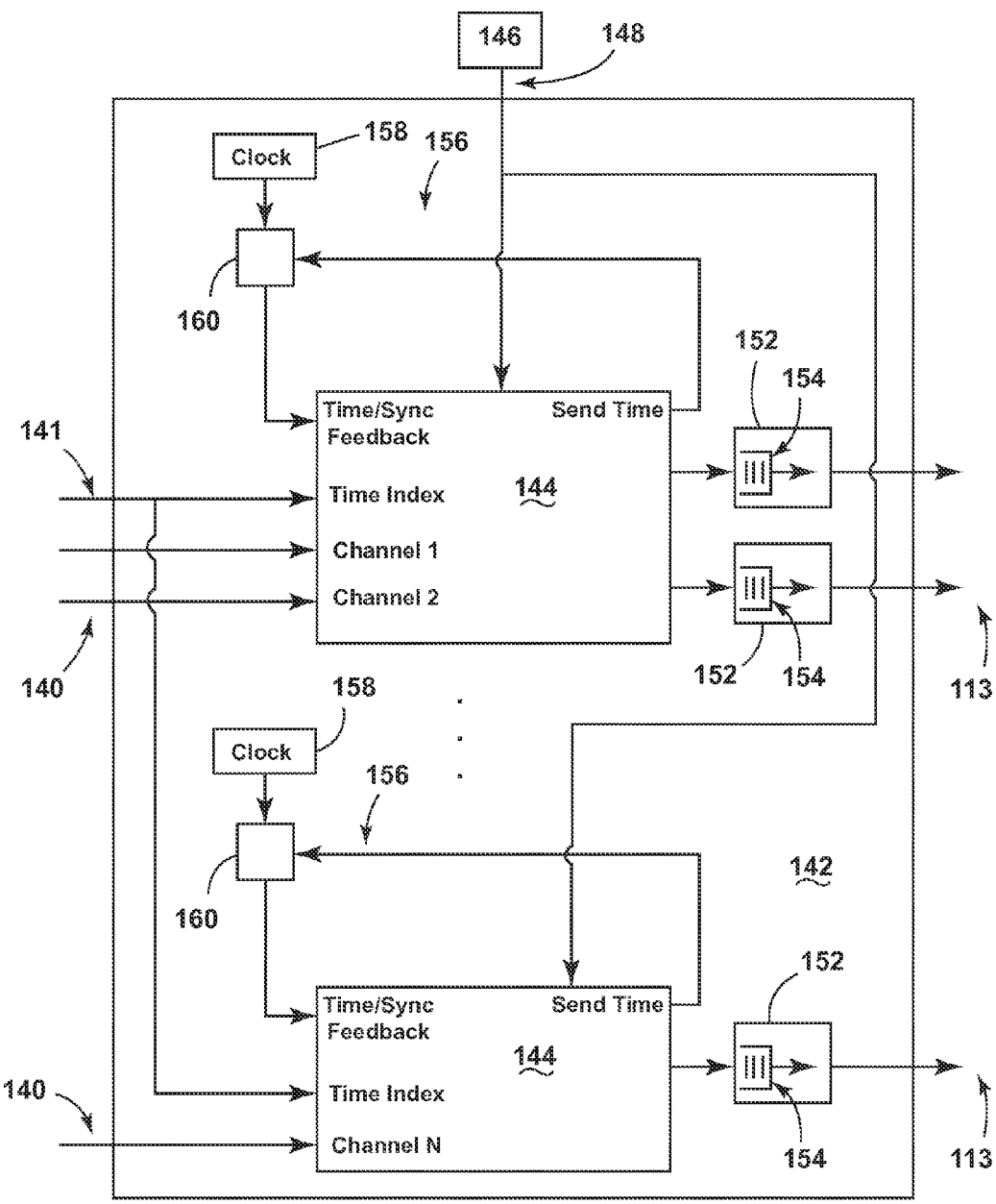
FIG. 3 is a schematic view of the avionics simulation device, in accordance with an embodiment of the invention.

Turning now to FIG. 3, the playback device 142 is described in greater detail. As shown, each data stream 113 being provided by the playback device 142 and/or playback controller 144 may include an interface unit 152 including a buffer 154. The interface unit 152 may include physical components, for example an Ethernet port, twisted wire connection, or other communicative interfaces, as needed for (in one example) ARINC 429, or may include a software implementation of an interface, such as packet forming for another connection. The buffer 154 may be configured to hold a portion of a data stream 113, which may be released, for example, according to a control signal or schedule. In one example, the buffer 154 may be sized according to the data stream 113 demand (e.g. size and rate) of each corresponding channel, and operate with a first-in-first-out functionality.

Also as shown, each playback controller 144 may further include a corresponding synchronizing feedback loop 156 including a clock 158, a scheduler 160, and the playback controller 144. The synchronizing feedback loop 156 may, for example, receive a "send" time value from the controller 144, including a first portion of information corresponding to the actual timing that a portion of the data stream 113 is provided to the avionics data bus 22 or released by the interface unit 152. The send time value may also include a second portion of information from the recorded time index 141 corresponding to timestamp the same portion of the data stream 113 was recorded.

The scheduler 160 may receive both portions of information of the send time value, in addition to a current-time value from the clock 158, and determine, compute, or estimate an inherent lag of the playback device 142. Stated another way, the processing by the playback controller 144, and/or the providing of the data stream 113 by way of the interface unit 152 may introduce an unexpected time lag while prevents a real-time simulation fidelity in relation with the recorded avionics data. The synchronizing feedback loop 156 attempts to further time-synchronize the providing of the data stream 113 by accounting for this time lag by, for example, scheduling (via the scheduler 160) the providing of the data stream 113 with relation to the lag.

For instance, if the scheduler 160 determines the actual timing of the providing is running 5 microseconds slower than it should be, as determined from a relative clock 158 timing and a relative recorded time index 141 timing, the scheduler 160 may effective "schedule," or instruct the playback controller 144 to "schedule" the providing of the respective data stream to occur 5 microseconds sooner than it would other have provided the data stream 113. As with the above-described time-synchronization, the feedback loop 156 synchronization may occur on a per channel 140, a per data stream 113, per a grouping of channel 140 or data stream 113, or a per playback controller 144 basis.

While a clock 158 is described, embodiments of the invention may include using an alternative time reading for the feedback loop 156 synchronization, for example, using a GPS clock.

Figure 4:
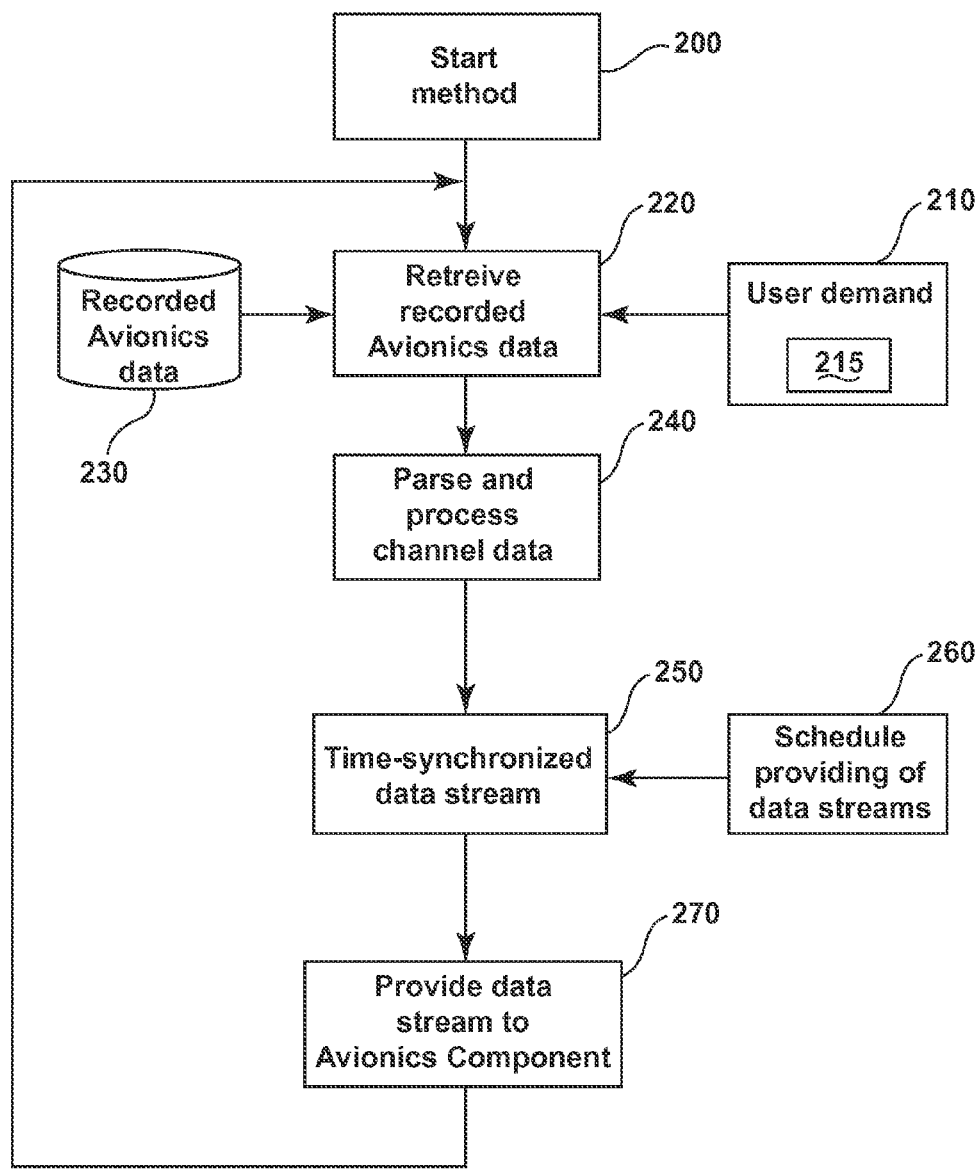
FIG. 4 is a flowchart illustrating an operation of the avionics simulation device.

FIG. 4 illustrates an exemplary flowchart illustrating an embodiment of the invention. The method assumes that real-time data streams from a previous flight have already been recorded and stored in an accessible format, available for use by the method, as described above. The method begins at step 200. A user may optionally provide a user demand in step 210. The user demand 210 may include a simulation and/or playback start time, stop time, playback speed, direction of playback (forward in time or reverse in time), step increments, etc., as explained above. The user demand in step 210 may also include a recorded time index 215, as explained above. In step 220, the method retrieves the recorded avionics data 230, in accordance with the user demand from step 210. At step 240, the playback device may parse and process the channel data, in accordance with the recorded time index 215 and/or the user demand from step 210. In step 250, the playback device time-synchronizes the data stream in accordance with the recorded time index and/or the user demand from step 210. In optional step 260, the synchronizing feedback loop may provide additional scheduling to account for any other time-synchronizing issues. Finally, at step 270, the playback device provides the data stream to the avionics component in accordance with the time synchronization and the schedule. The sequence of steps depicted is for illustrative purposes only, and is not meant to limit the method in any way as it is understood that the steps may proceed in a different logical order or additional or intervening steps may be included without detracting from embodiments of the invention.

Many other possible embodiments and configurations in addition to that shown in the above figures are contemplated by the present disclosure. For example, one embodiment of the invention contemplates parsing the recorded avionics data 136 into the plurality of channels 140 in the playback device 142. Additionally, the design and placement of the various components may be rearranged such that a number of different in-line configurations could be realized.

The embodiments disclosed herein provide a method of simulating a real-time aircraft system input to an avionics component from recorded avionics data. The technical effect is that the above described embodiments enable the repeated invocation of a recorded instance of avionics data which provides the identical signal environment that the onboard avionics experienced during the acquisition process. One advantage that may be realized in the above embodiments is that the above described embodiments enable hardware and/or software testing, such as during hardware in the loop simulation, which requires electrical signals necessary to operate an avionics component under test as if it was installed in its operating role. In some cases, qualified hardware is needed to supply those electrical signals, the cost of which is prohibitive. Furthermore, labs having the qualified hardware may be limited in numbers and/or availability. Thus, with embodiments of the invention, expensive qualified hardware used to generate the data inputs may no longer be needed, resulting in significant cost reduction to hardware in the loop simulations. For example, a relatively inexpensive host computer and commercial avionics interface cards may be able to simulate a similar offering as the qualified hardware.

Another advantage that may be realized in the above described embodiments in during repeated testing methodology since the embodiments can be used to simulate the same data inputs over and over again without error and with a repeated real-time fidelity during each simulation. This allows for easier and more accurate regression test efforts, for example, in a lab or development setting.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of simulating a real-time, aircraft system input to an avionics component for an aircraft, the method comprising:
   receiving, during a non-flight operation, a user demand for a sequence of aircraft system input, wherein the aircraft system input includes inputs generated during previously concluded flight operations;
   retrieving data streams corresponding to the user demand from a data-base of data streams previously recorded from real-time data streams generated during the previously concluded flight operations;
   time-synchronizing the retrieved data streams;
   providing the time-synchronized data streams to a deterministic avionics data bus communicatively coupled with the avionics component; and
   selective performing a simulation methodology on the avionics component in response to the time-synchronize data streams provided by the deterministic avionics data bus, wherein the simulation methodology is selectively performed as if the avionics component is operating under normal flight operations.

2. The method of claim 1 wherein the user demand comprises a playback rate and the providing of the time-synchronized data streams is provided at the playback rate.

3. The method of claim 2 wherein the playback rate comprises at least one of real time, slower than real time, or faster than real time.

4. The method of claim 3 wherein the playback rate comprises a time step.

5. The method of claim 4 wherein the time step is a constant time increment.

6. The method of claim 1 wherein the data streams previously recorded from real-time data streams comprise data streams representative of at least one of an inertial reference data, a global positioning system data, air data computer data, instrument landing system data, navigation data, distance measuring equipment data, or selectable control panel data.

7. The method of claim 1 wherein avionics component comprises at least one of a flight management system, control display unit, primary flight display, or navigation display.

8. The method of claim 1 wherein the providing further comprises providing the time-synchronized data streams by way of an ARINC 429 interface.

9. The method of claim 1 further comprising retrieving, from the data-base of previously recorded data streams, a recorded time index corresponding to the data streams.

10. The method of claim 9 further comprising time-synchronizing the retrieved data stream in accordance with the recorded time index.

11. The method of claim 10 wherein the time-synchronizing further comprises scheduling the providing of the time-synchronized data streams.

12. The method of claim 11 wherein the providing occurs in accordance with the schedule.

13. The method of claim 1 wherein the providing further comprises providing the time-synchronized data streams by way of an Ethernet interface.

14. The method of claim 1 wherein the providing further comprises providing the time-synchronized data streams by way of a serial interface.

15. A method of testing an avionics component in a simulated aircraft environment, the method comprising:
receiving, during a non-flight testing operation, a user demand for a sequence of aircraft system input, wherein the aircraft system input includes inputs generated during previously concluded flight operations;
retrieving data streams corresponding to the user demand from a data-base of data streams previously recorded from real-time data streams generated during the previously concluded flight operations;
time-synchronizing the retrieved data streams;
providing the time-synchronized data streams to a flight management system by way of an ARINC 429 data bus; and
selective performing a testing methodology on the avionics component in communication with flight management system, wherein the testing methodology is selectively performed as if the flight management system is operating under normal flight operations.

* * * * *